United States Patent
Takaki et al.

(10) Patent No.: US 6,943,819 B2
(45) Date of Patent: Sep. 13, 2005

(54) MULTICAST MEETING UNIT AND MULTICAST MEETING PROGRAM

(75) Inventors: Toshimasa Takaki, Itabashi-ku (JP); Akino Inoue, Meguro-ku (JP); Masaki Sato, Ota-ku (JP); Toshio Oka, Yokohama (JP); Satoshi Senga, Tokorozawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/953,522

(22) Filed: Sep. 30, 2004

(65) Prior Publication Data

US 2005/0037743 A1 Feb. 17, 2005

Related U.S. Application Data

(62) Division of application No. 10/115,282, filed on Apr. 4, 2002, now Pat. No. 6,812,955.

(30) Foreign Application Priority Data

Apr. 6, 2001 (JP) .......................................... 2001-109339

(51) Int. Cl.[7] .............................................. H04N 7/14
(52) U.S. Cl. ................................ 348/14.02; 348/14.08; 455/416
(58) Field of Search ........................ 348/14.01–14.03, 348/14.07–14.12; 455/416; 379/93.17, 93.21, 93.08; 709/204

(56) References Cited

U.S. PATENT DOCUMENTS 4,962,521 A 10/1990 Komatsu et al.
5,909,543 A 6/1999 Tanaka et al.
6,353,456 B1 3/2002 Sato
6,812,955 B2 * 11/2004 Takaki et al. ............ 348/14.08

FOREIGN PATENT DOCUMENTS

| JP | 05-252511 | 9/1993 |
| JP | 07-298231 | 11/1995 |
| JP | 2001128133 A | 5/2001 |

* cited by examiner

Primary Examiner—Wing Chan
(74) Attorney, Agent, or Firm—Browdy and Neimark, PLLC

(57) ABSTRACT

The invention provides a television meeting unit that is capable of displaying a picture smoothly on a middle participation terminal. To realize such television meeting unit, the multicast meeting unit is provided with a picture coding means for coding an input picture, a picture transmission means for transmitting the coded picture by mean of multicast, a picture receiving means for receiving the transmitted coded picture, a picture decoding means for decoding the received picture, a picture display means for displaying the decoded picture, a middle participation notice means for notifying middle participation in a meeting, and a middle participation terminal detection means for detecting the middle participation notice and for transmitting it to the picture coding means. The picture coding means, upon receiving the middle participation notice from the middle participation terminal detection means, changes the coding format to the in-frame coding format.

20 Claims, 14 Drawing Sheets

PICTURE DATA PACKET TO BE TRANSMITTED

NOTICE TO INDIVIDUALS

NOTICE THROUGH PROPAGATION ROUTE

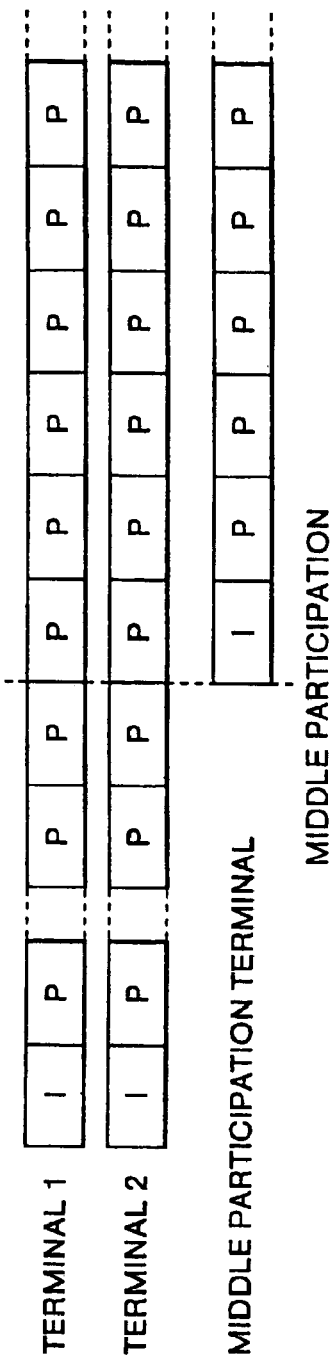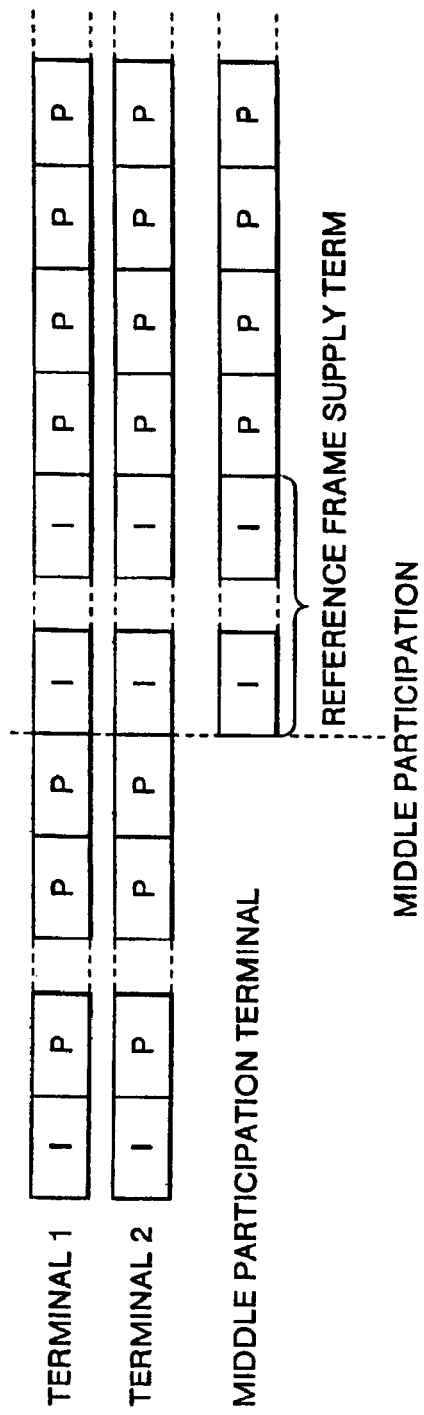

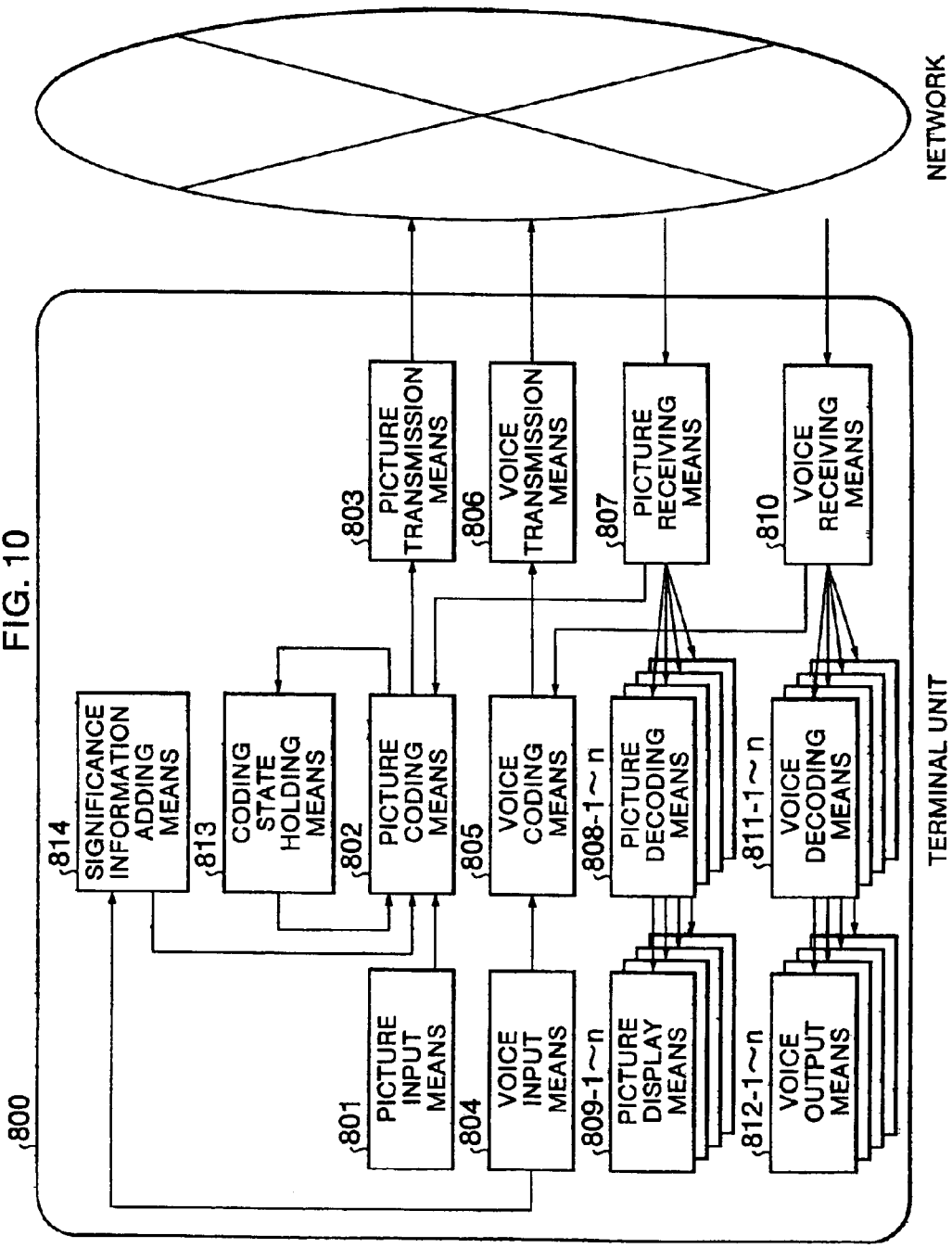

PICTURE DATA PACKET TO BE TRANSMITTED

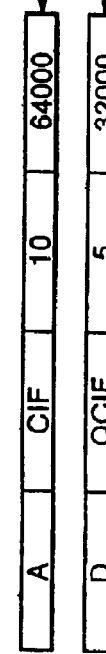
FIG. 12(A) INITIAL STATE OF MEETING
FIG. 12(B) MIDDLE PARTICIPATION OF TERMINAL D
FIG. 12(C) MIDDLE WITHDRAWAL OF TERMINAL A AND TERMINAL D

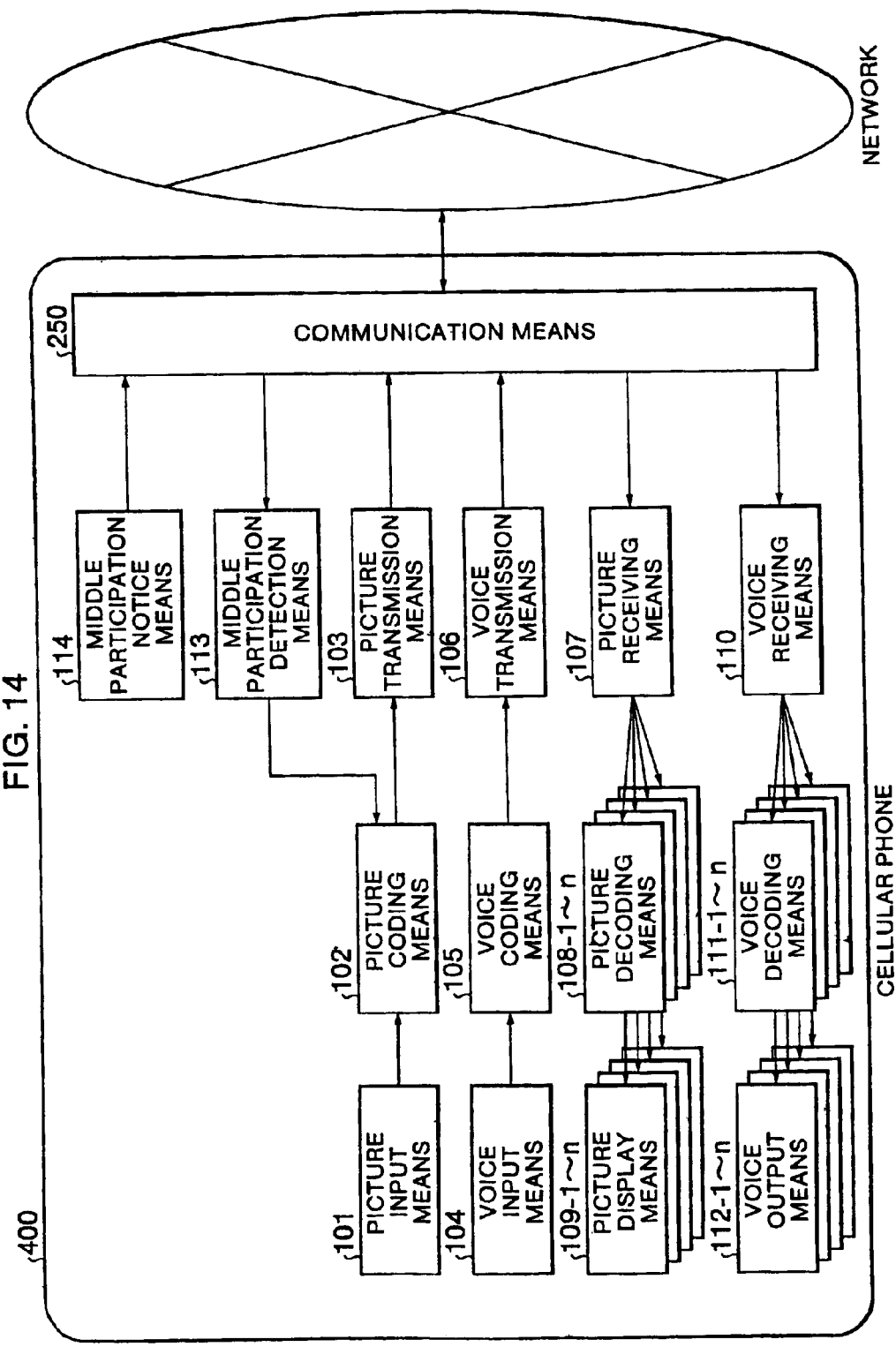

MULTICAST MEETING UNIT AND MULTICAST MEETING PROGRAM

This application is a divisional of Ser. No. 10/115,282 filed Apr. 4, 2002, now U.S. Pat. No. 6,812,955.

BACKGROUND OF THE INVENTION

1. Field of the Invention

The present invention relates to a television meeting unit, a television meeting system, and a method for controlling a television meeting system, and particularly relates to a television meeting unit, a television meeting system, and a method for controlling a television meeting system capable of shortening the time required to display a picture of meeting participants to a new participant who participates in the middle of a meeting.

2. Description of Prior Art

Heretofore, a unit for multiplying the picture and voice at multiple points, namely so-called MCU (Multipoint Control Unit), is needed to hold a television meeting between multiple points.

However, with development of the Internet recently, the group broadcast function so-called multicast has been available, and as the result it becomes possible by use of the multicast to hold an electronic meeting between multiple points without preparation of a particular unit such as MCU.

FIG. 1 and FIG. 2 show a typical exemplary structure of a multicast television meeting system that uses the picture and voice. FIG. 1 shows a connection diagram to a network, and FIG. 2 is a functional block diagram for showing a schematic structure of terminal unit. The picture and voice generated from the respective terminal units 12-1 to 12-x are transmitted broadcasterly to the respective terminal units 12-1 to 12x, and the received picture and voice are displayed individually or in the synthesized form to realize the television meeting.

The picture and voice of a television meeting system in the form of compressed code are transmitted usually because of the communication capacity restriction. Typically, H. 261 format or MPEG1 format is used as the picture compression coding system. In these picture compression coding systems, the in-frame coded picture in which the pixel value is coded as it is and the inter-frame prediction coded picture are used with switching selectively. The time redundancy of the picture with slight motion and change is reduced by use of the inter-frame prediction coded picture in which the difference between the previous frame and the next frame is coded because the next frame is very similar to the previous frame. On the other hand, in the case of the picture with quick motion or scene change, the in-frame coded picture is used effectively in which the pixel value is coded as it is used effectively because the correlation between frames is slight. In the general television meeting, the in-frame coded picture is transmitted at first and then the inter-frame coded picture is transmitted thereafter because the motion is not so quick.

At first in the case that a participant terminal participates in the middle in the conventional multicast meeting unit, the new participant receives the inter-frame prediction coded picture that is the meeting data served up to that time. Therefore, the terminal that participates in the middle and receives the inter-frame prediction coded picture cannot display a normal picture because no reference picture (in-frame coded picture) is available, or cannot display the picture until it receives an in-frame coded picture.

At second in the case that the processing capability of the new participant terminal is different, it is required for every participant terminal to perform with a set value within the processable range and furthermore it is required to change the set value due to the middle participation.

SUMMARY OF THE INVENTION

To solve the above-mentioned problem, the present invention is provided with a function that a middle participation information is transmitted when a terminal (middle participation terminal) participates in a meeting in the middle, and other terminals (already participating terminal) receive and detect the information and transmit the in-frame coded picture (I-frame) instead of the inter-frame prediction coded picture when the already participating terminals transmit the data. Thereby, it becomes possible to display a picture smoothly (a picture of a meeting can be displayed in a short time) to the terminal that participates in the middle and the multiple point television meeting is held smoothly by use of a multicast meeting unit.

Furthermore, the present invention is provided with a function that the processing capability information on terminals that are participating in a meeting and terminals that are to participate in the meeting is held, collated, and converted to the coded parameter that is processable by any terminal. Thereby, the information is converted so as to be processable by any terminal in the case that it is required to convert the coding parameter due to the middle participation.

Furthermore, the present invention is provided with a function that the priority adding function to terminals that precipitate in a meeting and terminals that are to participate in the meeting, and the coding parameter of the important data is converted. Thereby, the individual terminals are coded correspondingly to the priority, and the important subject is discussed preferentially in the meeting.

Furthermore, the present invention is provided with a function that the priority of the terminals are managed so as to avoid the band over due to I-frame broadcast transmission by adjusting the middle participation and the terminal performance difference to transmit I-frame from the terminal of the higher priority. Thereby, a picture of the terminal of the higher priority is displayed first, and the picture of other meeting participants is displayed later, and as the result a picture of the terminal of higher priority can be displayed earlier without adverse effect on the band of the network.

Therefore, the first object of the present invention is to shorten the time for waiting the display of a picture received by the middle participation terminal in a multicast meeting unit.

The second object of the present invention is to make the coding parameter acceptable to every terminal even in the case that the coding parameter, which has been used by every terminal, becomes unacceptable to a part of terminals due to the middle participation in the meeting.

The above-mentioned objects and advantages of the present invention will be apparent based on the embodiments described in detail hereinafter with reference to the drawings.

BRIEF DESCRIPTION OF THE INVENTION

FIG. 9A and FIG. 9B are diagrams showing the picture coding format transmitted in the present invention, in which FIG. 9A represents the picture coding format in the case that a multicast meeting is continuing without the middle participation, and FIG. 9B represents the picture coding format that is converted from P-picture coding to I-picture coding in the case that a middle participation notice is detected during the meeting.

FIG. 10 is a functional block diagram showing the schematic structure of a multicast meeting unit in accordance with the second embodiment of the present invention.

Figure 11:
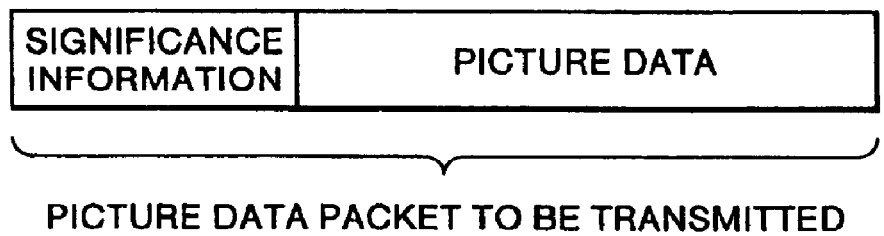

FIG. 11 is a diagram showing the data structure of the priority information in the second embodiment.

FIG. 12 is a diagram showing the table structure that holds the picture coding information, the state that appears when a terminal participates in a meeting in the middle and when a terminal withdraws from the meeting, and one example of the picture coding format used in the meeting at that time.

Figure 13:
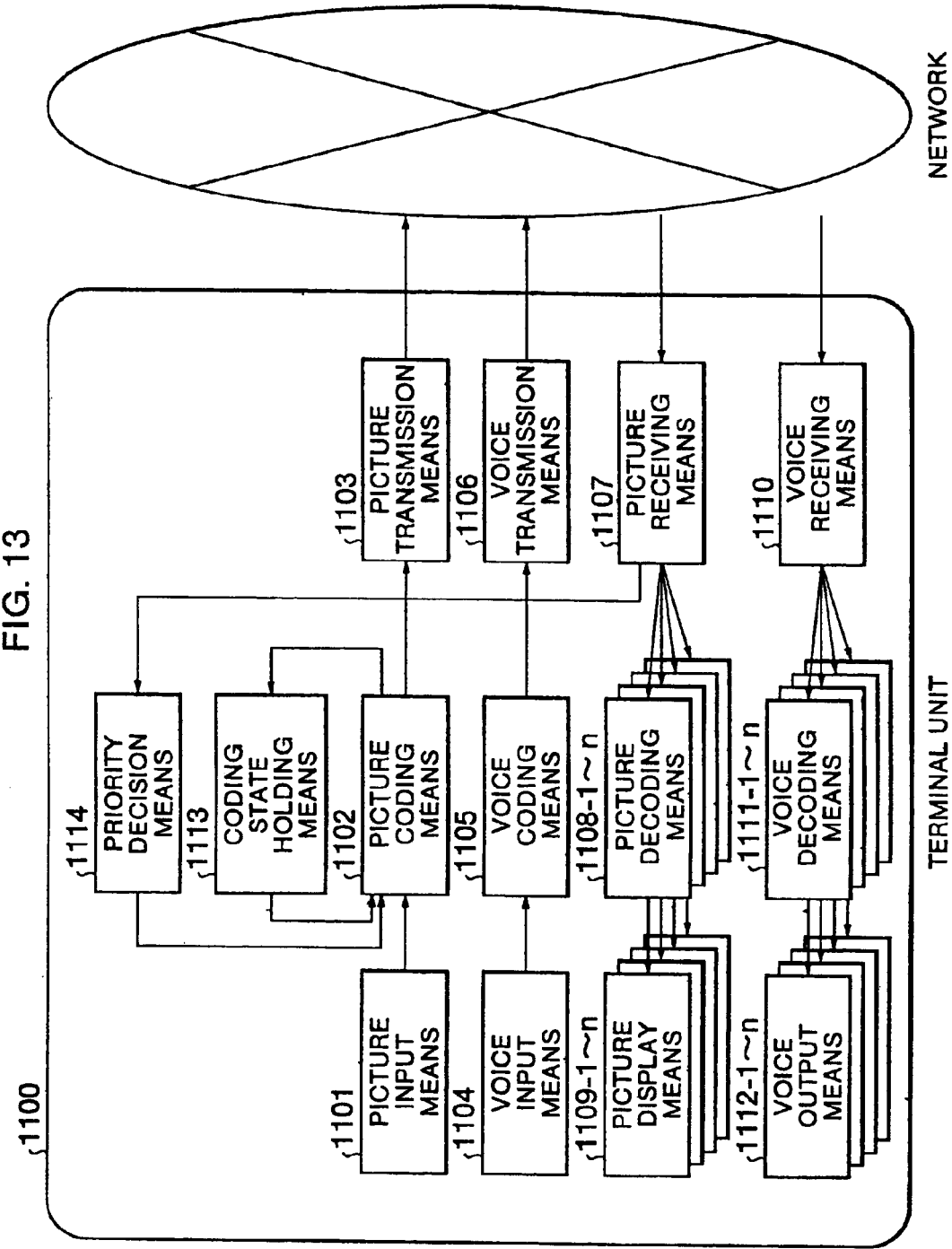

FIG. 13 is a functional block diagram showing the schematic structure of a multicast meeting unit in accordance with the third embodiment of the present invention.

FIG. 14 is a functional block diagram showing the schematic structure of a multicast meeting unit (cellular telephone) in accordance with the fourth embodiment of the present invention.

DETAILED DESCRIPTION OF THE PREFERRED EMBODIMENTS

Embodiments of the present invention will be described in detail with reference to FIG. 3 to FIG. 14. The present invention is by no means limited to these embodiments, and can be applied with various modifications without departing from the spirit and the scope of the present invention.

(First Embodiment)

Figure 3:
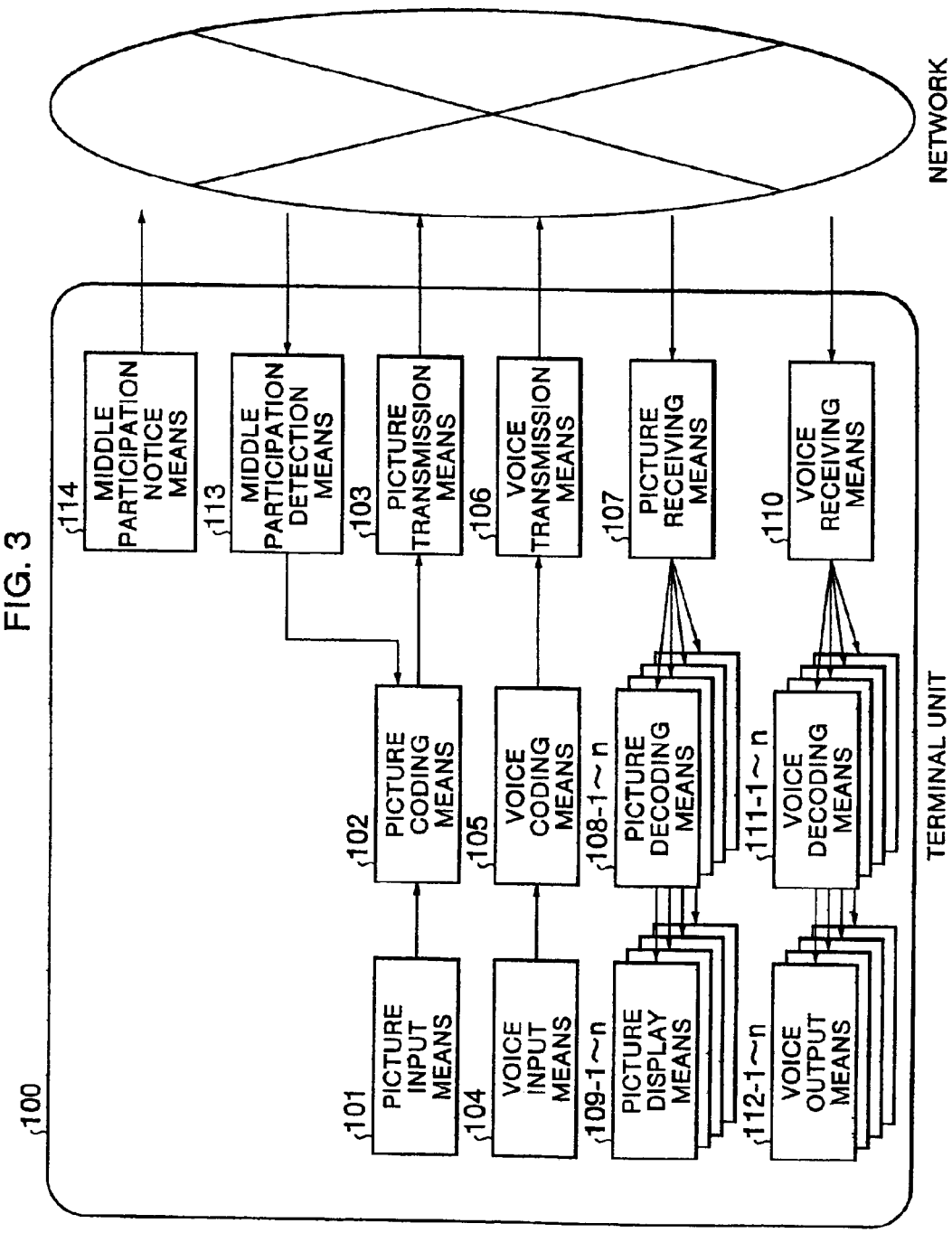
FIG. 3 is a functional block diagram showing the schematic structure of a multicast meeting unit in accordance with the first embodiment of the present invention.

At first, the configuration for displaying a picture smoothly on a terminal that participates in a meeting in the middle will be described hereinafter. FIG. 3 is a functional block diagram showing the schematic structure of the first embodiment of a multicast television terminal unit (simply referred to as "terminal unit" hereinafter depending on the case) of the present invention. In FIG. 3, 100 denotes a terminal unit, and the terminal unit is connected to a network and used like the system shown in FIG. 1. The terminal unit 100 supplies a picture data obtained from a picture input means 101 to a picture coding means 102, the picture coding means 102 compresses and codes the supplied picture data and supplies it to a picture transmission means 103, and the picture transmission means 103 transmits the compressed and coded picture data to the network. At that time, the picture coding means 102 changes the coding method when it obtains a middle participation information from a middle participation detection means 113.

Similarly, the terminal unit 100 supplies the voice data obtained from a voice input means 104 to a voice coding means 105, the voice coding means 105 compresses and codes the supplied voice data and supplies it to a voice transmission means 106, and the voice transmission means 106 transmits the compressed and coded voice data to the network. A picture receiving means 107 receives the compressed and coded picture data from the other terminal unit and supplies it to a picture decoding means 108. A plural number of picture decoding means 108 corresponding to the number of other terminal units are provided, each picture decoding means 108 codes the compressed and coded picture data so as to match with a corresponding terminal and supplies it to a picture display means 109. The number of picture display means 109 corresponds to the number of other terminal units. Each picture display means 109 displays a picture of a corresponding terminal.

Figure 4:
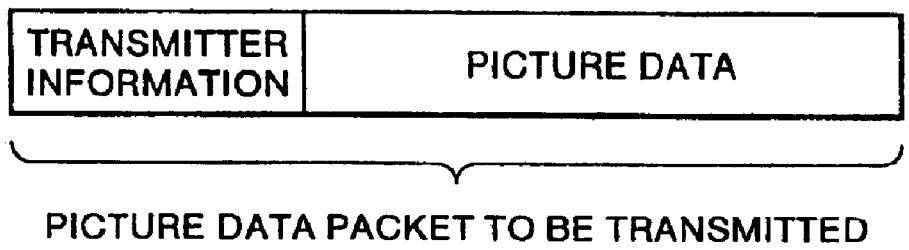
FIG. 4 is a diagram showing the data structure of a transmitter information in the first embodiment.

Similarly, a voice receiving means 110 receives the compressed and coded voice data from the other terminal unit, and supplies it to a voice decoding means 111. The number of voice decoding means 111 corresponds to the number of other terminal units. Each voice decoding means 111 decodes the compressed and coded voice data for a corresponding terminal, and supplies it to a voice output means 112. The number of voice output means 112 corresponds to the number of other terminal units. Each voice output means 112 outputs the voice of a corresponding terminal. A middle participation notice means 114 supplies a middle participation notice to the network when a terminal unit participates in the middle. FIG. 4 shows an example of a picture data packet to which a transmitter information has been added that is transmitted by the middle participation notice means 114. An example of the middle participation notice data, which is transmitted when a middle participation is notified, includes the data in which an address information on a transmittee and a transmitter information on a middle participation terminal are placed adjacently.

Figure 5:
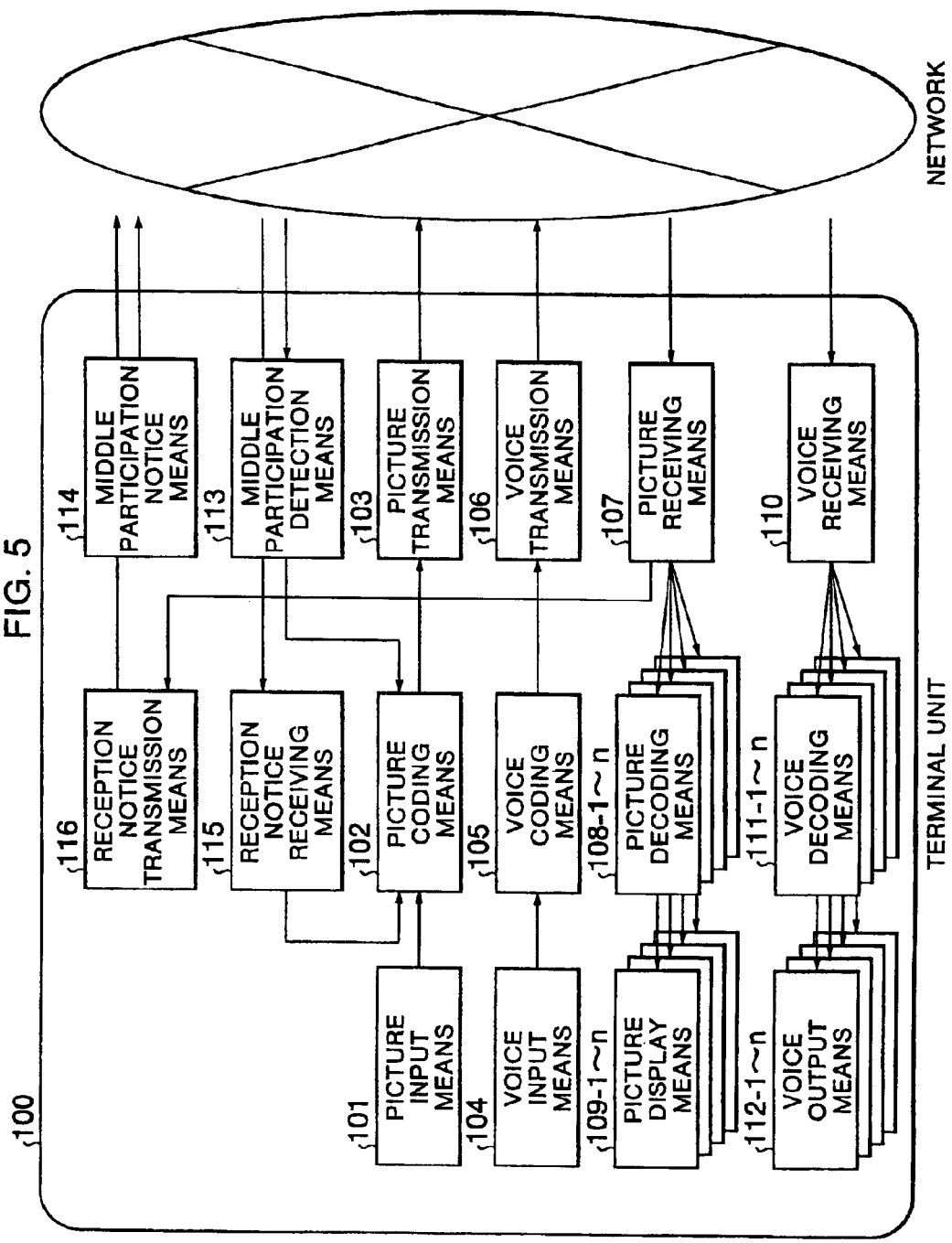
FIG. 5 is a functional block diagram showing the schematic structure of a multicast meeting unit to which a reception notice detection means is added in the first embodiment.

FIG. 5 is a functional block diagram showing the schematic structure to which a reception notice detection means is added. In FIG. 5, 116 denotes a reception notice transmission means for transmitting a reception notice when a middle participation terminal receives an in-frame coded picture from the other meeting terminal, and 115 denotes a reception notice receiving means of a (the other) meeting terminal for receiving a reception notice that has been transmitted from a middle participation terminal through the reception notice transmission means 116 (described in detail hereinafter).

Figure 6:
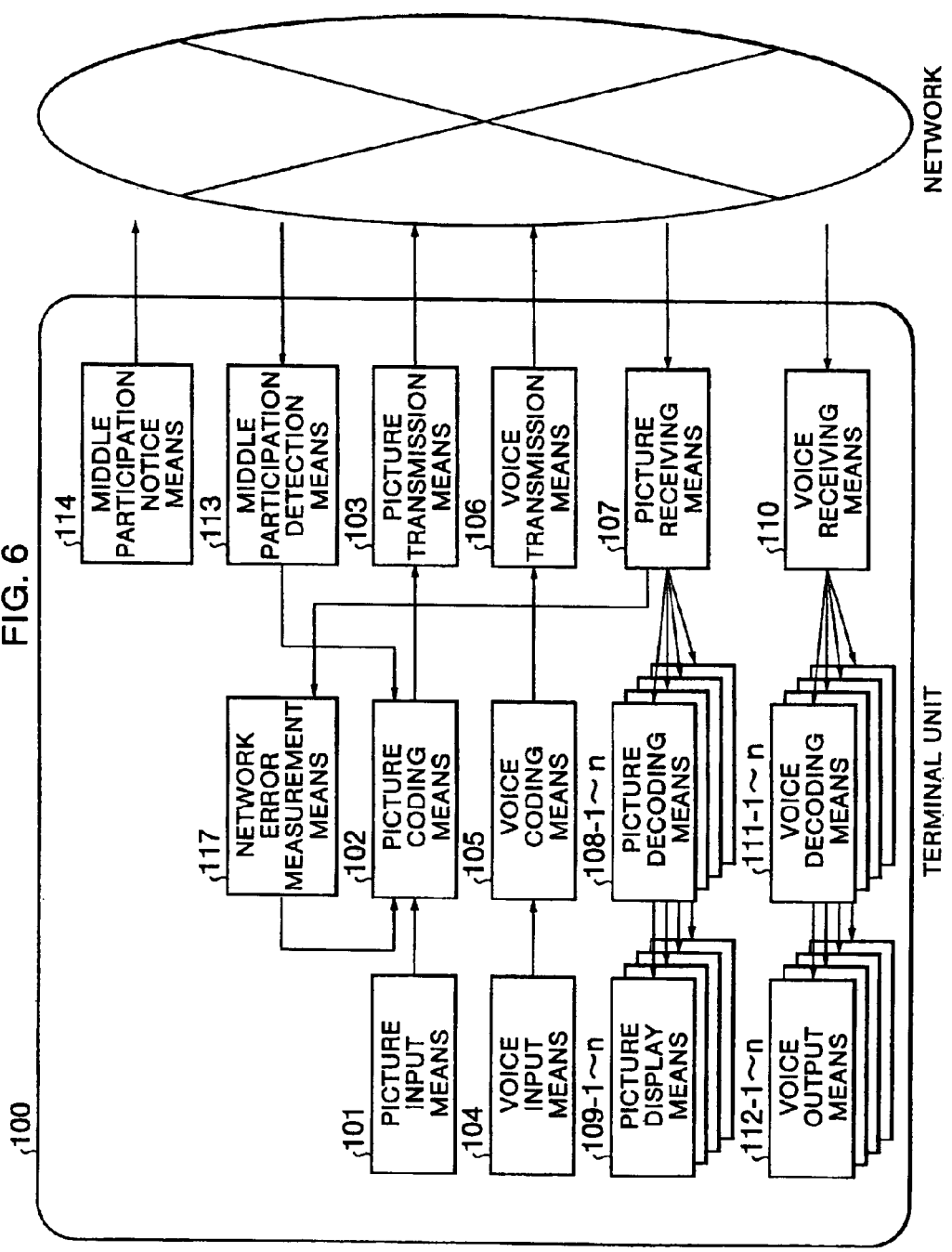
FIG. 6 is a functional block diagram showing the schematic structure of a multicast meeting unit to which a network error rate measurement means is added in the first embodiment.

FIG. 6 is a functional block diagram showing the schematic structure to which a network error rate measurement means has been added. In FIG. 6, 117 denotes a network error rate measurement means for measuring the network error rate when the picture data is obtained from the picture receiving means 107 (described in detail hereinafter).

Figure 7:
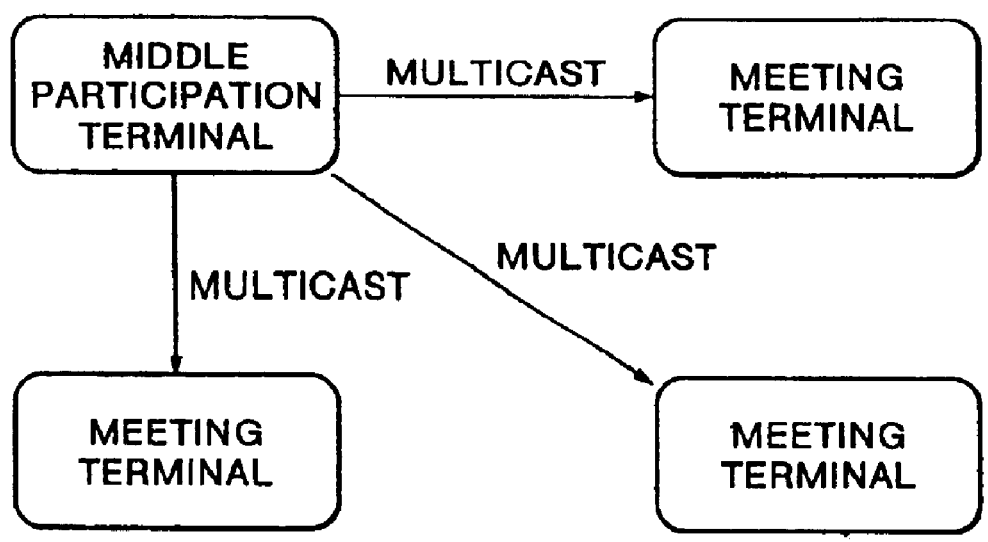
FIG. 7 is a diagram showing a method of middle participation notice by use of multicast in the first embodiment.
Figure 8A:
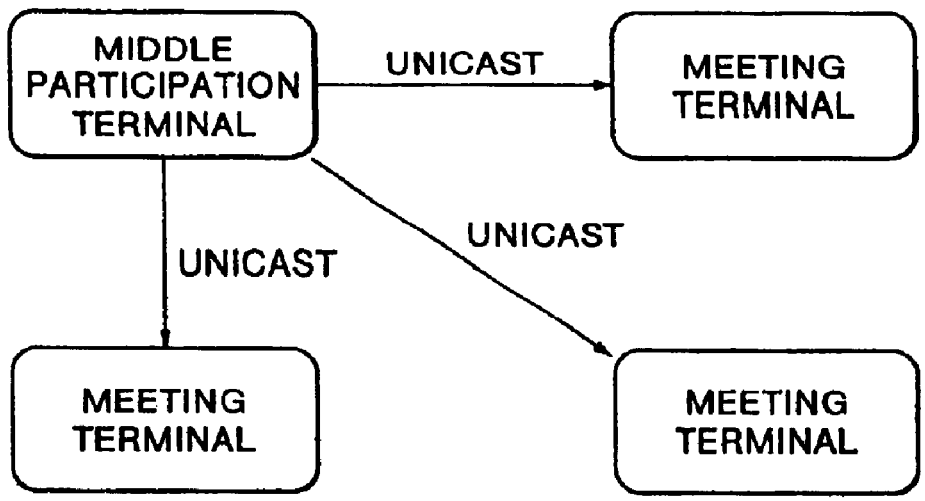
FIG. 8 is a diagram showing a method of middle participation notice by use of unicast in the first embodiment.
Figure 8B:
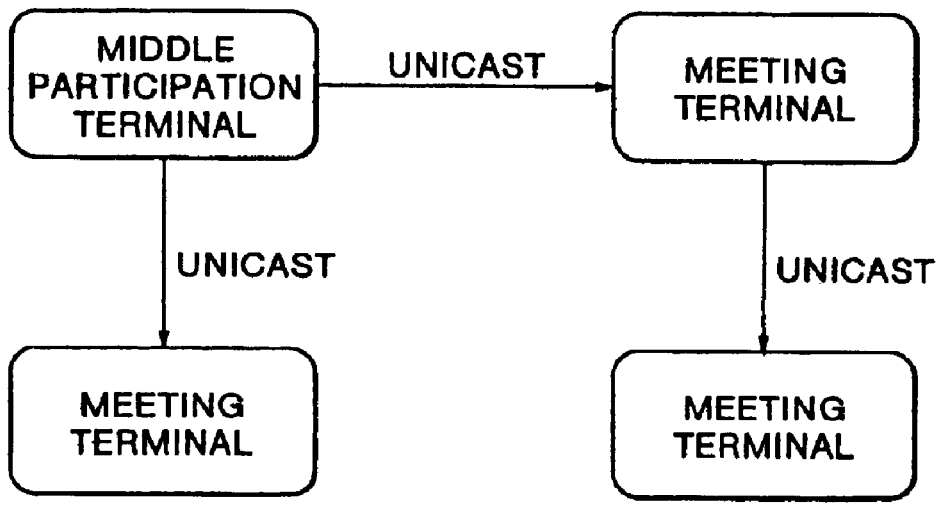

FIG. 7 shows a method of middle participation notice that uses the multicast, and FIG. 8A and FIG. 8B show methods of middle participation notice that use the unicast. Furthermore, FIG. 9A and FIG. 9B show coding formats that code a picture signal transmitted from the picture coding means 102. Out of these figures, FIG. 9A is a diagram for showing a coding format of a transmitted picture signal that is used conventionally and is used when a multicast meeting is continued without a middle participation in the present invention. Furthermore, FIG. 9B is a diagram for showing a method for changing the P-picture coding format to the I-picture coding format when a middle participation notice is received during the middle of a meeting, which is employed in the present invention. In FIG. 9A and FIG. 9B, I denotes the I-picture (in-frame coded picture), and P denotes the P-picture (inter-frame forward prediction coded picture).

The operation will be described herein under on the terminal unit having the above-mentioned structure. The picture data supplied from the picture input means 101 such as a camera is supplied to the picture coding means 102. The picture coding means 102 changes the coding format as described hereinafter based on the information supplied from the middle participation means 113, and compresses and codes the picture data. The compressed and coded picture data is transmitted to the network from the picture transmission means 103 by use of the multicast.

The voice data supplied from the voice output means 104 such as a microphone is supplied to the voice coding means 105. The voice coding means 105 compresses and codes the voice data. The compressed and coded voice data is transmitted to the network from the voice transmission means 106 by use of the multicast. The picture data transmitted from the other terminal unit is received by the picture receiving means 107 through the network. The picture receiving means 107 supplies the received picture data to the picture decoding means 108-1~n corresponding to the respective other terminal units with reference to the transmitter information on the picture data. One example of the transmitter information that is embedded in the data to be transmitted is shown in FIG. 4. The number of picture decoding means 108-1~n corresponds to the number of other terminal units. Each picture decoding means decodes the picture data to be transmitted to the picture display means 109-1~n. The number of picture display means 109-1~n corresponds to the number of other terminal units. Each picture display means displays the decoded picture data on a display.

The voice data transmitted from the other terminal unit is received by the voice receiving means 110 through the network. The voice receiving means 110 supplies the received voice data to the voice decoding means 111-1~n corresponding to the respective other terminal units with reference to the transmitter information on the voice data in the same manner as used in the case of the picture data. The number of voice decoding means 111-1~n corresponds to the number of other terminal units. Each voice decoding means decodes the voice data and supplies it to the voice output means 112-1~n. The number of voice output means 112-1~n corresponds to the number of other terminal units. Each voice output means outputs the decoded voice data from a speaker. Otherwise, a method, in which one terminal is provided with not a plurality of voice output means, but one terminal is provided with one voice output means by providing a voice synthesis means so-called mixer between the voice decoding means and the voice output means, may be employed.

When the terminal unit participates in a meeting in the middle, the middle participation notice means 114 notifies the other terminals of the middle participation through the multicast or unicast.

In the case that the middle participation is notified through the multicast, the middle participation notice means 114 notifies the other terminals of the middle participation simultaneously as shown in FIG. 7. On the other hand, in the case that the middle participation is notified through the unicast, two methods may be available as shown in FIG. 8. In the one method, the address of meeting terminals that are participating in a current meeting has been obtained previously and the middle participation is supplied individually as shown in FIG. 8A. In the other method, the middle participation is supplied to any one meeting terminal among meeting terminals that are currently participating in a meeting and the meeting terminal that has received the middle participation propagates it to the other meeting terminal successively as shown in FIG. 8B.

<Method for Changing Coding>

Methods shown in FIG. 9A and FIG. 9B are exemplified as the method for changing the coding format in the picture coding means 102.

In the case of the conventional transferred picture coding format as shown in FIG. 9A, a middle participation terminal receives a P-picture because terminals that are participating in a meeting currently transmit the P-picture when the middle participation terminal participates in the meeting in the middle. The middle participation terminal that receives the P-picture cannot decode a normal picture because the middle participation terminal has no I-picture, which is the reference picture.

However, it is possible to change the coding method when a middle participation terminal participates in a meeting in the middle because current participation terminals receive a middle participation notice. Therefore, the current terminals that are participating in the meeting receives the middle participation notice at the middle participation detection means 113 when the middle participation terminal participates in the meeting in the middle, and the information is supplied to the picture coding means 102. In response to the information, the picture coding means 102 that has continued coding to P-picture until now changes the coding format to I-picture that can be decoded singularly.

<Method for Setting I-Picture Sending Term>

Three I-picture sending terms are available as described herein under.

In the first method, the I-picture is sent for a certain time. One frame picture data of changed coding method or a certain number of frames of changed coding method is sent out, and the coding method is changed to the original coding method thereafter.

In the second method, when the middle participation terminal receives an in-frame coded picture from other meeting terminals, the middle participation terminal issues a reception notice to other meeting terminals, and other meeting terminals change the coding method to the original coding method. The second method will be described with reference to FIG. 5.

When the picture receiving means 107 of the middle participation terminal receives an I-picture from other meeting terminals, the information for notifying the reception is supplied to the reception notice transmission means 116. The reception notice transmission means 116 transmits a reception notice to other meeting terminals by use of the multicast as shown in FIG. 7 or by use of the unicast as shown in FIG. 8A. When the unicast is used, the transmitter information shown in FIG. 4 included in the received I-picture is used to specify the transmitter.

Other meeting terminals receive the reception notice through the reception notice receiving means 115, the information for notifying reception of the reception notice is supplied to the picture coding means 102, and the picture coding means 102 changes the picture coding format to the original format.

Because other meeting terminals can recognize that the middle participation terminal has received the reference picture (I-picture), other meeting terminals can continue to transmit the reference picture until the middle participation terminal receives the reference picture.

In the third method, the network error rate is measured, other meeting terminals continue to use the changed coding format and transmit the reference picture for only the time corresponding to the error rate. The third method will be described with reference to FIG. 6.

The network error rate measurement means 117 measures the error rate in the picture data received through the picture receiving means 107 based on, for example, the sequence number embedded in the picture data, and the measured error rate is supplied to the picture coding means 102. The picture coding means 102 determines the reference frame sending term shown in FIG. 9 depending on the error rate supplied from the network error rate measurement means 117. In detail, the doubled reference frame sending term may be employed for the doubled error rate. For example, if the reference picture of two frames is transmitted at the time of the middle participation under the condition that one packet error is included in 100 packets, the reference picture of doubled, namely four, frames is transmitted at the time of the middle participation when the error rate is doubled (the condition that two packet errors are included in 100 packets).

Because the picture receiving means 107 receives the picture data from a plurality of meeting terminals, the mounting method that satisfy the highest error rate may be employed. It is apparent that this method may be used for the middle participation terminal and other meeting terminals. Thereby, a plurality of I-picture, namely reference picture, can be sent out in the case that the network error rate is high, the probability of reception of the reference picture by the middle participation terminal is improved with minimized load on the network. By using the structure described hereinbefore, it is possible to display the picture of a meeting within a short time by use of the multicast television meeting unit even though a terminal participates in the meeting in the middle, and the multiple point television meeting can be continued smoothly.

(Embodiment 2)

Next, a mechanism for exchanging the processing capability information on each terminal so that all the terminals participating in a meeting can display the picture and a mechanism for giving the priority to the data that is important in the meeting will be described. FIG. 10 is a functional block diagram showing the schematic structure of the second embodiment of a multicast television meeting terminal unit of the present invention. In FIG. 10, 800 denotes a terminal unit, and the terminal unit is connected to a network and used.

The terminal unit 800 supplies the picture data obtained from a picture input means 801 to a picture coding means 802, the picture coding means 802 compresses and codes the supplied picture data and supplies it to a picture transmission means 803, and the picture transmission means 803 transmits the compressed and coded picture data to the network. At that time, the picture coding means 802 obtains a middle participation information from a picture receiving means 807 and changes the coding method. The terminal name of the middle participation terminal and the picture data (coding format, parameter) transmitted from the middle participation terminal are held in a coding state holding means 813.

Similarly, the voice data obtained from a voice input means 804 is supplied to a voice coding means 805, the voice coding means 805 compresses and codes the supplied voice data and supplies to a voice transmission means 806, and the voice transmission means 806 transmits the compressed and coded voice data to the network. At that time, the information such as voice level is supplied from the voice input means 804 to an significance information adding means 814. Furthermore, the voice coding means 805 obtains the voice coding format or voice coding parameter from a voice receiving means 810 and changes the coding method. Furthermore, the picture receiving means 807 receives the compressed and coded picture data from the other terminal unit through the network, and supplies it to a picture decoding means 808. At that time, the received picture information is supplied to the picture coding means 802. The number of picture decoding means 808 corresponds to the number of other terminal units, and the compressed and coded picture data is decoded so as to match with each terminal and supplied to picture display means 809. The number of picture display means 809 corresponds to the number of other terminal units. The picture display means displays a picture of each terminal.

Similarly, the voice receiving means 810 receives the compressed and coded voice data from the other terminal unit through the network, and supplies it to a voice decoding means 811. The number of voice decoding means 811 corresponds to the number of other terminal units, and the compressed and coded voice data is decoded so as to match with each terminal and supplied to a voice output means 812. The number of voice output means 812 corresponds to the number of other terminal units. The voice output means outputs the voice of on each terminal.

<Significance Information Addition>

FIG. 11 shows one example of a picture data packet that is to be transmitted to which the significance information is added. FIG. 12 shows an example of the structure of a table for holding the picture coding information, the state of middle participation and middle withdrawing, and the picture coding format used in the meeting at that time.

The operation of the terminal unit having the structure described hereinabove will be described herein under.

The picture data taken in from the picture input means 801 such as camera is supplied to the picture coding means 802, and the picture data is compressed and coded.

A method described hereinunder, in which the middle participation is detected by the picture receiving means 807 without using the middle participation notice means 114 as in the case of the embodiment 1 when the picture coding means 802 compresses and codes the picture data, may be employed.

The picture receiving means 807 refers the transmitter information on the received picture data as shown in FIG. 4. If the transmitter information is a transmitter information on a terminal other than current participation terminals, the transmitter information is judged as that of a middle participation terminal, and the information for notifying participation of the middle participation terminal is supplied to the picture coding means 802.

As an exemplary "method for discrimination between the current participation terminal and the middle participation terminal", a method in which the transmitter information on the current participation terminals is stored in a memory of each terminal may be employed. In the case that the data having the transmitter information that is not stored in the memory is supplied, it is possible to judge the data to indicate participation of a middle participation terminal.

The middle participation is detected as described hereinabove, and the picture coding means 802 changes the coding format to the in-frame coded picture (reference picture) as shown in FIG. 9. As the result, it is possible to display the picture of other meeting terminals on the middle participation terminal within a short time.

The compressed and coded picture data is transmitted to the network through the picture transmission means 803. The picture transmission means 803 can add the significance to the picture data as shown in FIG. 11 when the picture data is transmitted. The significance represents the dynamic significance in the meeting such as a speaker. A method may be employed, in which when the level of significance of a speaker is up, the voice input level supplied from the voice input means 804 is supplied to the significance information adding means 814, and the significance information adding means 814 adds the significance corresponding to the voice level. The picture quality is improved, the frame rate is increased, or the picture size may be changed by use of the picture coding means 802 for the case of the picture data of high significance.

For example, the processing is performed normally at a performance value (parameter): B that is lower than the performance value (parameter): A of the terminal having the lowest performance based on the processing capability information exchange (<that will be described hereinafter as<parameter setting relevant to the processing capability of the terminal>) with emphasis on the saving of NW band and immediate data processing, and only when the data to which the significance is added comes, the level of the performance value is up to a higher value within a range lower than the performance value A for the data with significance. As described hereinabove, the quality of the picture supplied from a terminal that is considered to be important such as a speaker in the meeting is changed dynamically, and as the result the quality of a picture that attracts attentions of participants is improved. The voice data supplied from the voice input means 804 such as a microphone is supplied to the voice coding means 805. The voice coding means 805 compresses and codes the voice data. The compressed and coded voice data is transmitted to the network by use of the multicast through the voice transmission means 806.

The picture data transmitted from other terminal units is received by the picture receiving means 807 through the network. The picture receiving means 807 supplies the received picture data to the picture decoding means 808-1~n corresponding to the respective other terminal unit with reference to the transmitter information on the picture data. The number of picture decoding means 808-1~n corresponds to the number of other terminal units. Each of the picture decoding means 808-1~n decodes the picture data and supplies it to the picture display means 809-1~n. The number of picture display means corresponds to the number of other terminal units similarly, and the decoded picture data is displayed on a display.

The voice data transmitted from the other terminal units is received by the voice receiving means 810 through the network. The voice receiving means 810 supplies the received voice data to the voice decoding means 811-1~n corresponding to the respective terminal units with reference to the transmitter information on the voice data. The number of voice decoding means 811-1~n corresponds to the number of other terminal units. Each of the voice decoding means 811-1~n decodes the voice data and supplies it to the voice output means 812-1~n. The number of voice output means 812-1~n corresponds to the number of other terminal units similarly, and the decoded voice data is outputted from a speaker. In some cases a method may be employed, in which one terminal is provided with not a plurality of voice output means, but one terminal is provided with only one voice output means with aid of a voice synthesis means so-called mixer interposed between the voice decoding means and the voice output means.

Examples of the significance addition includes a case in which significance is added depending on the user, that is, the significance is up for the user of the chairman, and a case in which a high significance is added to a terminal displaying the significant picture motion, other than the case in which the high significance is added depending on the input level of the voice. Furthermore, a method in which the picture coding means 802 changes the picture coding format will be described herein under. A method shown in FIG. 9 is exemplified as a method in which the picture coding means 802 changes the coding format similarly to the embodiment 1.

<Parameter Setting Relevant to Processing Capability of Participation Terminal>

The processing capability information exchange will be described as the premise for adding the above-mentioned significance. A middle participation terminal codes the data by use of the coding format and parameter that are relevant to the processing capability (CPU performance) and supplies it to other meeting terminals. The other meeting terminals that have received it obtain the picture size, the number of frames, and the data quantity of the received picture information, and then changes the coding format so as to fit the received data, and as the result the other meeting terminals can supply the data that is relevant to the processing capability of the middle participation terminal.

A method for changing the coding will be described in detail with reference to FIG. 12A, FIG. 12B, and FIG. 12C. At first, in the initial state of a meeting shown in FIG. 12A, terminals A, B, and C are participant in the meeting. In this state, because the picture coding parameter sent from the terminal A is lowest, the picture coding format CIF, 10 fps, and 64 bps, that is the picture coding format of the terminal A, is used as the picture coding format in the meeting. Herein, the picture size CIF represents 352 (pixels)×288 (pixels), and QCIF represents 176 (pixels)×144 (pixels).

Next, the state in which the terminal D (QCIF, 5 fps, 32 kbps) participates in the meeting in the middle is shown in FIG. 12B. Herein, because the processing capability of the terminal D is lowest, the picture coding format of the terminal D that is lowest in the processing capability is used in the meeting in the same manner as used previously. Next, the state in which the terminal A and the terminal D withdraw from the meeting in the middle is shown in FIG. 12C. The data of the terminal A and the terminal D that have withdrawn from the meeting is deleted from the table, the picture coding information on the terminal C having the lowest processing capability among the residual terminals is used similarly, and the meeting is continued by the residual meeting terminals. The level of the processing capability is defined in terminal units herein. The reason is that all the values of the respective coding information are lower than those of other terminals. In the case that the terminal T1 has the picture size of the lowest value t1, the terminal T2 has the frame rate of the lowest value t2, and the terminal T3 has the bit rate of the lowest value t3, (t1, t2, and t3) are used as the parameter for decision.

H. 323 capacity exchange has been known as a conventional method for determining parameters used by each terminal as described hereinabove. In this method, after each terminal extends the session, parameters that can be encoded and decoded are exchanged each other and a meeting is continued by use of parameters that are usable each other. This method is possible only for 1:1 meeting, and IMCU should be used for using this method in the case that three or more terminals participate. In this case, at first, each terminal transmits parameters that can be encoded and decoded to MCU. Next, MCU detects parameters that can be acceptable for all the terminals based on the parameters supplied from each terminal, and transmits the parameter to each terminal. Each terminal participates in the meeting by use of the parameters that have been detected by MCU.

However, because the structure of the present embodiment does not use MCU, this method is not applied. In the present embodiment, the multicast address is acquired from DHCP server, and the picture and voice are transmitted immediately. The parameter is changed to the parameter that is usable each other on the terminal side that has received the picture and voice. Because each terminal decides the parameter based on the supplied picture and voice as described hereinabove, the structure having no MCU can be employed. Furthermore, in the conventional method, all the terminals should transmit parameters to MCU, MCU re-detects the parameter that is usable for all the terminals and distributes the parameter to each terminal in the case a terminal participates in the meeting in the middle. However, in the case of the present embodiment, these procedures can be eliminated, a middle participation terminal can transmit the picture and voice immediately, and the time required for the middle participation terminal to participate in the meeting is shortened.

The same is applied to the voice data, the middle participation terminal codes the voice data by use of the coding format and parameter that are relevant to the processing capability and supplies it to other meeting terminals, the other meeting terminals that receive it obtain the coding format and coding parameter of the received voice information and change the coding to the relevant coding to thereby supply the data that is relevant to the processing capability of the middle participation terminal. As described hereinabove, in the present embodiment, by changing the coding method to a method that is relevant to the received coding format (change the coding parameter), it is possible to continue a meeting (the meeting data is displayed even on a terminal having the low processing capability) when a meeting terminal having a low processing capability participates in the meeting in the middle. Furthermore, by using the significant information, the high significant picture such as the picture of a speaker is displayed with higher picture quality.

The middle participation detection means 113 described in the embodiment 1 and the coding state holding means 813 described in the second embodiment 2 may be used in combination to receive the middle participation notice through the middle participation detection means 113. In this case, an exemplary method, in which the current coding information is held in the coding state holding means 813 and the coding format is changed, may be realized.

(Embodiment 3)

Next, a mechanism for avoiding the inconvenience that the band is occupied fully when all the terminals that are participating in a meeting transmit I-frame simultaneously in response to reception of a notice of middle participation will be described herein under.

FIG. 13 is a functional block diagram showing the schematic structure of the third embodiment of a multicast television meeting terminal unit of the present invention.

Figure 1:
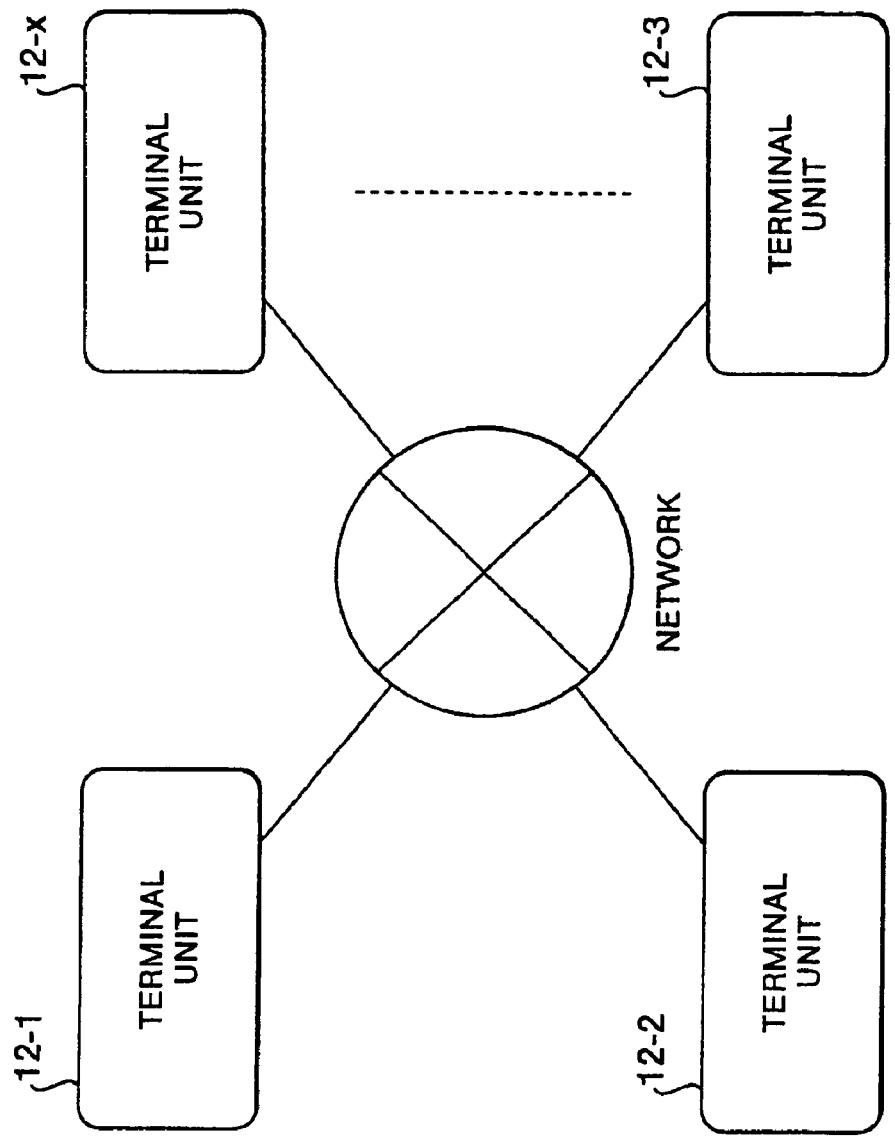
FIG. 1 is a functional block diagram showing the connection of a conventional multicast multiple point meeting system to a network.
Figure 2:
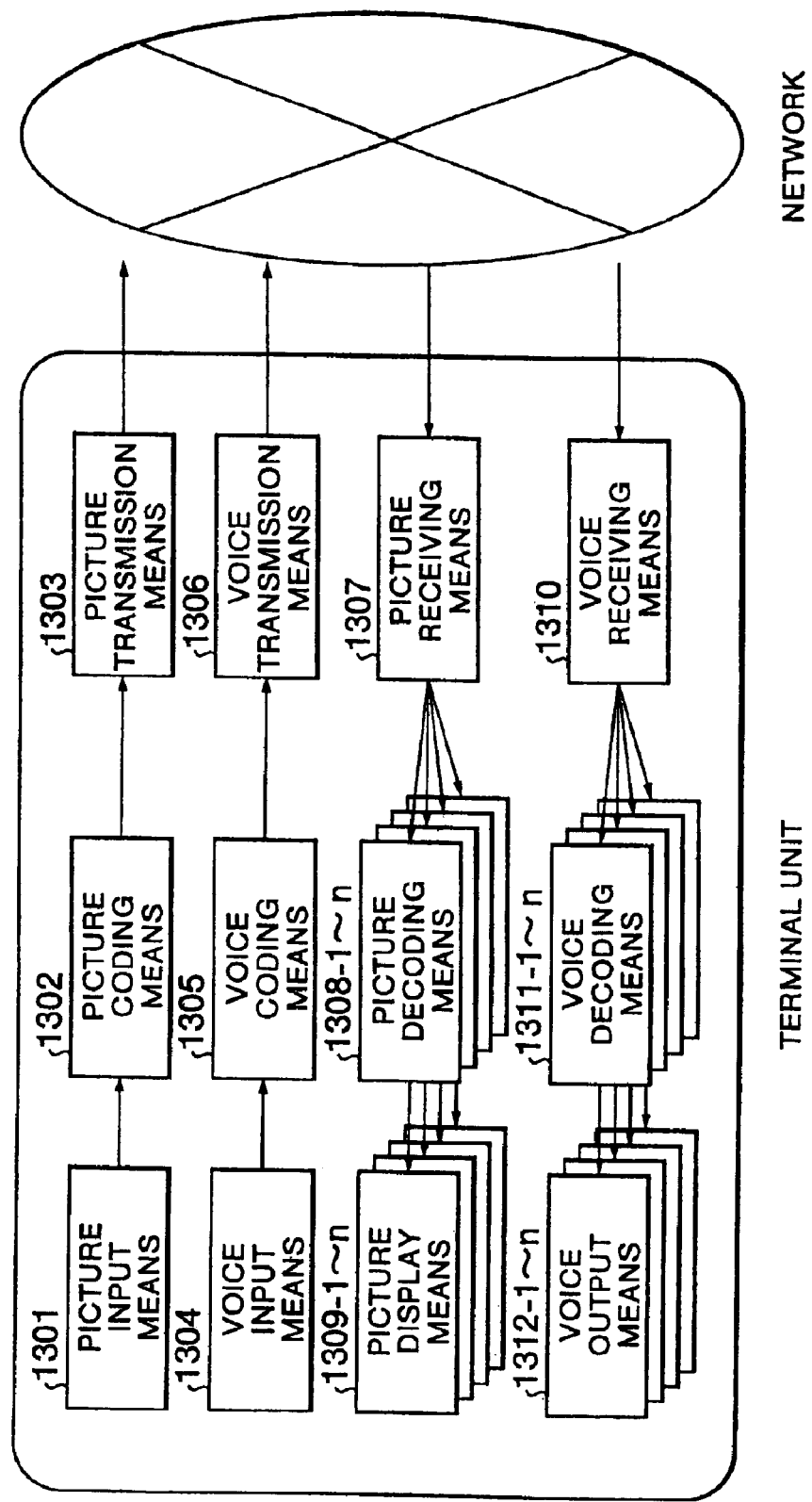
FIG. 2 is a functional block diagram showing the schematic structure of the terminal unit of the conventional multicast multiple point meeting system.

In FIG. 13, 1100 denotes a terminal unit, and the terminal unit is connected to the network and used as in the case of the system shown in FIG. 1. The terminal unit 1100 supplies the picture data obtained from a picture input means 1101 to a picture coding means 1102, the picture coding means 1102 compresses and codes the supplied picture data and supplies it to a picture transmission means 1103, and the picture transmission means 1103 transmits the compressed and coded picture data to the network. At that time, the picture coding means 1102 changes the coding method depending on the priority supplied from the priority decision means 1114. The coding information that is used before the change is held in the coding state holding means 1113 in the same table form as used in the embodiment 2.

The voice data obtained from a voice input means 1104 is supplied to a voice coding means 1105, the voice coding means 1105 compresses and coded the supplied voice data and supplies it to a voice transmission means 1106, and the voice transmission means 116 transmits the compressed and coded voice data to the network. Furthermore, a picture receiving means 1107 receives the compressed and coded picture data from the other terminal unit through the network, and transmits it to a picture decoding means 1108. At that time, the received picture information is supplied also to the priority decision means 1114. The number of picture decoding means 1108 corresponds to the number of other terminal units, and the compressed and coded picture data is decoded so as to match with each terminal and supplied to the display means 1109. The number of picture display means 1109 corresponds to the number of other terminal units similarly, and the picture of each terminal is displayed.

Similarly, a voice receiving means 1110 receives the compressed and coded voice data from the other terminal unit through the network, and supplies it to the voice decoding means 1111. The number of voice decoding means 1111 corresponds to the number of other terminal units, and the compressed and coded voice data is decoded so as to match with each terminal and is supplied to the voice out means 1112. The number of voice output means 1112 corresponds to the number of other terminal units, and the voice of each terminal is outputted.

The operation of the terminal unit having the structure as described hereinabove will be described hereinafter. The picture data supplied from the picture input means such as a camera is supplied to the picture coding means 1102. The picture coding means 1102 changes the coding format based on the priority information supplied from the priority decision means 1114, and compresses and codes the picture data.

The priority information is prepared by the priority decision means 1114 that has obtained the picture data information from the picture receiving means 1107. For example, a promoter of the meeting assigns the priority to each terminal previously at the time before the meeting is held. In many cases, the terminal of the chairman is assigned a high priority, and a terminal used by a general participant is assigned a low priority. The picture coding means 1102 changes the picture coding format according to the priority when a middle participation terminal is detected. For example, when a middle participation terminal is detected, other terminals change the coding format from the in-frame prediction coded picture to the inter-frame coded picture as shown in FIG. 9. At that time, if all the terminal changes the coding format simultaneously, the picture data quantity transmitted through the network increases sharply to result in pressed band. To avoid the above-mentioned problem, the picture is changed to the in-frame coding picture in the order successively from the terminal having the highest priority for transmission with reference to the priority information. Thereby, the middle participation terminal can display the picture in the order according to the priority.

The compressed and coded picture data is transmitted from the picture transmission means 1103 to the network by use of the multicast. The voice data supplied from the voice output means 1104 such as a microphone is supplied to the voice coding means 1105. The voice coding means 1105 compresses and codes the voice data. The compressed and coded voice data is transmitted from the voice transmission means 1106 to the network by use of the multicast.

The picture data transmitted from the other terminal unit is received by the picture receiving means 1107 through the network. The picture receiving means 1107 supplies the received picture data to the picture decoding means 1108-1~n corresponding to the respective other terminal units with reference to the transmitter information on the picture data. The number of picture decoding means 1108-1~n corresponds to the number of other terminal units. Each of the picture decoding means 1108-1~n decodes the picture data and transmits the picture to the picture display means 1109-1~n. The number of picture display means 1109-1~n corresponds to the number of other terminal units similarly, and the decoded picture data is displayed on a display.

The voice data transmitted from the other terminal unit is received by the voice receiving means 1110 through the network. The voice receiving means 1110 supplies the received voice data to the voice decoding means 1111-1~n corresponding to the respective other terminal units with reference to the transmitter information on the voice data. The number of voice decoding means 1111-1~n corresponds to the number of other terminal units, and the voice decoding means 1111-1~n decode the voice data and supply it to the voice output means 1112-1~n. The number of voice output means 1112-1~n corresponds to the number of other terminal units similarly, and the decoded voice data is outputted from a speaker. In some cases a method may be employed, in which one terminal is provided with not a plurality of voice output means, but one terminal is provided with only one voice output means with aid of a voice synthesis means so-called mixer interposed between the voice decoding means and the voice output means.

For example, a method shown in FIG. 9 that is similar to the method described in example 1 may be exemplified as a method that is used by the picture coding means 1102 to change the coding format. In the present example, the (a part of) priority information is transmitted from the picture receiving means 1107 to the priority decision means 1114, but the transmission is not necessarily required. For example, (1) the data transmission from 1107 to 1114 can be eliminated by holding the priority information previously in the priority decision means 114 (a dashed line in FIG. 13 indicates the case). Furthermore, for example, (2) only the information that indicates whether the I-frame is received or not (whether a middle participation terminal participates or does not) is supplied from the picture receiving means 1107 to the picture coding means 1102, and the coding method is changed immediately or later depending on the information supplied from the priority decision means 1114. As described hereinabove, various modifications may be employed.

As described hereinabove, in the present embodiment, by use of the structure described hereinabove, not only it is possible to display the picture data of a meeting within a short time as described in the example 1 but also it is possible that the picture data of the terminal having the higher priority can be displayed earlier without pressing of the band of the network by use of the priority information. In the latter case, for example, the picture data with high priority of, for example, the chairman is displayed earlier and the picture data of other meeting participants are displayed later generally.

(Embodiment 4)

In the present embodiment, the unit other than personal computers such as desktop or potable computers can be used as the terminal unit that can participates in a meeting (including middle participation). FIG. 14 is a functional block diagram showing the schematic structure of the fourth embodiment of a terminal unit of the present invention. The cellular phone is used as the terminal unit in the present embodiment. In FIG. 14, 400 denotes a cellular phone served as the terminal unit, and the cellular phone 400 is connected to the network and used as in the case of the terminal unit 100 shown in FIG. 1. The cellular phone 400 is provided with a picture input means 101 for receiving a picture signal, a picture coding means 102 for receiving the picture signal from the picture input means 101 and for compressing and coding the picture signal, a picture transmission means 103 for generating the compressed and coded transmission picture data, and a communication means 250 for transmitting the compressed and coded picture data generated from the picture transmission means 103 to the network as in the case of the terminal unit 100 described in the first embodiment.

Furthermore, the cellular phone 400 is provided with a voice input means 104 for receiving a voice signal, a voice coding means 105 for receiving the voice signal from the voice input means 104 and for compressing and coding the voice signal, and a voice transmission means 106 for transmitting the compressed and coded voice data to the communication means 250.

Furthermore, the cellular phone 400 is provided with a picture receiving means 107 for receiving the compressed and coded picture data supplied from the other cellular phone or terminal unit through the network, picture decoding means 108 for decoding the received picture data, and picture display means 109 for displaying the decoded picture. The number of picture decoding means 108 corresponds to the number of other cellular phones, and the supplied picture data is decoded so as to match with each cellular phone or terminal unit and is supplied to the picture display means 109. The number of picture display means 109 corresponds to the number of other cellular phones similarly, and the picture display means display the picture on the respective terminals.

Furthermore, the cellular phone 400 is provided with a voice receiving means 110, voice decoding means 111, and voice output means 112 for receiving and reproducing the voice transmitted from the other cellular phone or terminal unit. The voice receiving means 110 receives the compressed and coded voice data from the other cellular phone or terminal unit through the network and supplies it to the voice decoding means 111. The number of voice decoding means 111 corresponds to the number of other cellular phones, and the compressed and coded voice data is decoded so as to match with each terminal and supplied to the voice output means 112. The number of voice output means 112 corresponds to the number of other cellular phones and terminal units similarly. The voice output means outputs the voice of each terminals.

Furthermore, the cellular phone 400 is provided with a middle participation notice means 114 that is operated when this cellular phone participates in a meeting in the middle, and a middle participation detection means 113 for detecting a middle participation notice signal transmitted when the other cellular phone participates in the meeting in the middle as in the case of the terminal unit in accordance with the first embodiment.

The communication 250 has not only a function to control the communication between the cellular phone 400 and a base station but also a function to transmit the compressed and coded picture data and compressed and coded voice data to the network and a function to receive the compressed and coded picture data and compressed and coded voice data from the network, namely the two-way function. Furthermore, the communication means 250 functions to transmit a middle participation notice signal to the network and to receive a middle participation notice signal from the network.

Because the cellular phone 400 is provided with the above-mentioned function, it is possible for the cellular phone 400 in accordance with the present embodiment to participate in a multicast meeting. The middle participation notice means 114 supplies the middle participation information to the communication means 250 through the network when the cellular phone 400 participates in the meeting in the middle. On the other hand, the middle participation detection means 113 receives and detects a middle participation notice signal transmitted from the other cellular phone from the network through the communication means 250.

The notice and detection of middle participation in a multicast meeting are operated in the same manner as that operated in the first embodiment. The present invention is applied for potable terminal units as the mobile apparatus such as the cellular phone similarly.

In each embodiment, the in-frame coded "picture" detection units are used as the information for detecting middle participation, but otherwise a method in which the rate of the in-frame coded "macro-block" in the picture is detected as the unit to detect middle participation may be employed. In detail, in the case that the coding format such as MPEG-4 that uses the in-frame coded macro-block is used, not the in-frame coded picture is detected, but the rate of the in-frame coded macro-block in the picture is detected to detect middle participation. For example, the following detection method is exemplified as a method for detecting the in-frame coded macro-block.

At first, the macro-block coding format in the picture is counted. Because the coding format information is stored in each macro-block, the macro-block coding format can be counted easily by referring the coding format information. Next, the rate of the in-frame coded macro-block in the picture is counted, and if the rate is equal to a half or more, then it is judged to be the middle participation.

Furthermore, in each embodiment, the case in which the number of the picture decoding means, picture display means, voice decoding means, and voice output means corresponding respectively to the number of other terminals (hardware or software having such function) are provided is described, but otherwise one hardware or software having such function performs these processing by means of time sharing technique in some cases. Therefore, the number of these means is by no means limited.

Furthermore, in each embodiment, (1) coding method represents the type of codec (CODEC: COmpression/ DECompression) such as H. 261, H 263, or MPEG, (2) coding format represents the difference between the in-frame coding (I-frame) and the inter-frame coding (P-frame), and (3) coding information (coding parameter) represents the picture size, frame rate, and bit rate. Furthermore, in (3), the coding information is synonymical for the coding parameter, but in some cases the coding information is used to represent the item of attribute and the coding parameter is used to represent the item of attribute value differently (difference between the attribute and attribute value).

The present invention is described based on the preferred embodiments shown in the drawings, but it will be obvious to those skilled in the art that the present invention can be easily modified and changed in various ways without departing from the spirit and the scope of the invention. The present invention includes such various modifications.

What is claimed is:

1. A cellular phone comprising:
   a picture input means for receiving a picture stream such as a camera;
   a picture coding means for coding the input picture stream to prepare the coded picture information to be transmitted;
   a picture transmission means for transmitting the coded picture information to a network by use of the multicast;
   a picture receiving means for receiving the picture information transmitted by use of the multicast;
   picture decoding means for decoding the received data;
   picture display means for displaying the decoded picture stream;
   middle participation notice means for notifying the middle participation in a meeting;
   middle participation terminal detection means for* detecting the terminal that participates in the meeting in the middle, and for supplying the information to said picture coding means; and
   a communication means for controlling the communication between said cellular phone and a base station,
   wherein said picture coding means receives the detection signal from said middle participation terminal detection means and changes the coding format to the in-frame coding format, on the other hand said communication means, in addition to communication control between cellular phone and said base station, transmits the compressed and coded picture data and the compressed and coded voice data to the network, receives the compressed and coded picture data and the compressed and coded voice data from the network, furthermore transmits said middle participation notice signal to the network, and receives said middle participation notice signal from the network.

2. A cellular phone comprising:
   a picture input means for receiving a picture stream such as a camera;
   a picture coding means for coding the input picture stream to prepare the coded picture information to be transmitted;
   a picture transmission means for transmitting the coded picture information to a network by use of the multicast;
   a picture receiving means for receiving the picture information transmitted by use of the multicast;

picture decoding means for decoding the received data;

picture display means for displaying the decoded picture stream; participation terminal storing means for storing the transmitter information on terminals that are participating in a meeting, and a communication means for controlling the communication between said cellular phone and a base station, wherein said picture receiving means, upon receiving an in-frame coded picture, notifies said picture coding means of the reception, and said picture coding means, upon receiving the notice from said picture receiving means, changes the coding format to the in-frame coding format, on the other hand said communication means, in addition to communication control between cellular phone and said base station, transmits the compressed and coded picture data and the compressed and coded voice data to the network, receives the compressed and coded picture data and the compressed and coded voice data from the network, furthermore transmits said middle participation notice signal to the network, and receives said middle participation notice signal from the network.

3. The cellular phone according to claim 2, wherein said picture receiving means, in the case that a received inframe coded picture is found to be an in-frame coded picture transmitted from a terminal other than terminals stored in said participation terminal information storing means by recognizing the terminal with reference to said participation terminal information storing means, notifies said picture coding means of the reception.

4. The cellular phone according to claim 2, wherein said picture coding means, in the case that a notice supplied from said picture receiving means is found to be an in-frame coded picture received from a terminal other than terminals stored in said participation terminal information storing means as the result of reference to said participation terminal information storing means, changes the coding format.

5. A cellular phone comprising:

a picture input means for receiving a picture stream such as a camera;

a picture coding means for coding the input picture stream to prepare the coded picture information to be transmitted; a picture transmission means for transmitting the coded picture information to a network by use of the multicast; a picture receiving means for receiving the picture information transmitted by use of the multicast; a picture decoding means for decoding the received data; a picture display means for displaying the decoded picture stream; and a coding information storing means for storing the coding parameter of terminals that are participating in a meeting and terminals that participate in the meeting in the middle if a terminal participates in the meeting in the middle, a communication means for controlling the communication between said cellular phone and a base station, wherein said picture coding means codes the picture data by use of a changed coding parameter that can be displayed on all the terminals that are participating in the meeting with reference to said coding information storing means, on the other hand said communication means, in addition to communication control between cellular phone and said base station, transmits the compressed and coded picture data and the compressed and coded voice data to the network, receives the compressed and coded picture data and the compressed and coded voice data from the network, furthermore transmits said middle participation notice signal to the network, and receives said middle participation notice signal from the network.

6. The cellular phone according to claim 1, further comprising a priority decision means for deciding and holding the information on the priority of the meeting terminal and for supplying the information to said picture coding means, wherein said picture coding means receives the information from said priority decision means and changes the coding format.

7. The cellular phone according to claim 5, further comprising a significance information adding means for deciding and holding the information on the significance of the information to be transmitted in the meeting and for supplying the information to said picture coding means, wherein said picture coding means receives the information from said significance information adding means and changes the coding parameter.

8. The cellular phone according to claim 1, wherein said middle participation notice means transmits the middle participation information to all the terminals that are participating currently in the meeting by use of the multicast when a terminal participates in the meeting in the middle.

9. The cellular phone according to claim 1, wherein said middle participation notice means transmits the middle participation information to all or a part of the terminals that are participating currently in the meeting by use of the unicast when a terminal participates in the meeting in the middle.

10. The cellular phone according to claim 1, wherein said middle participation terminal detection means detects an in-frame coded picture transmitted from a middle participation terminal.

11. The cellular phone according to claim 1, wherein said middle participation terminal detection means detects the rate of an in-frame coded macro-block supplied from a middle participation terminal.

12. The cellular phone according to claim 1, further comprising a network error rate measurement means for measuring the error rate of the network and for supplying the information on the error rate of the network to said picture coding means, wherein said picture coding means changes the coding format during the time corresponding to the error rate of the network.

13. The cellular phone according to claim 2, further comprising: a reception notice transmission means for receiving a notice of the in-frame coded picture reception from said picture reception means and for transmitting a reception notice of the in-frame coded picture; and a reception notice receiving means for receiving a reception notice from said reception notice transmission means and for supplying the reception notice information to said picture coding means, wherein said picture coding means continues the change of the coding format until said picture coding means receives said reception notice information.

14. The cellular phone according to claim 1, wherein said picture coding means changes the changed coding format to the original coding format after a certain time period elapses.

15. The cellular phone according to claim 1, wherein said picture coding means codes the picture data by use of coding method corresponding to the coding method of the received picture.

16. The cellular phone according to claim 1, wherein said picture coding means codes the picture data with changing the size to the same size as the size of the received picture.

17. The cellular phone according to claim 1, wherein said picture coding means codes the picture data with changing the number of frames corresponding to the number of frames of the received picture.

18. The cellular phone according to claim 1, wherein said picture coding means codes the picture data with changing the data quantity corresponding to the data quantity of the received picture.

19. The cellular phone according to claim 1, further comprising: a voice coding means for coding the voice data and for preparing the coded voice information to be transmitted; a voice transmission and receiving means for transmitting and receiving the coded voice information; a voice decoding means for decoding the received voice information; and, a voice output means for outputting the decoded voice data, wherein said voice coding means codes the voice data with changing the coding method corresponding to the coding method of the received voice.

20. The cellular phone according to claim 1, further comprising: a voice coding means for coding the voice data and for preparing the coded voice information to be transmitted; a voice transmission and receiving means for transmitting and receiving the coded voice information; a voice decoding means for decoding the received voice information; and a voice output means for outputting the decoded voice data, said voice coding means codes the voice data with changing the coding parameter corresponding to the coding parameter of the received voice.

* * * * *